United States Patent [19]

Wu

[11] Patent Number: 4,966,126
[45] Date of Patent: Oct. 30, 1990

[54] ASH-COLLECTING PAN AND VENTILATION ADJUSTING DEVICE FOR A BARBECUE SET

[76] Inventor: Hsi-Liang Wu, 263, Jin Shui Street, Hsinchu, Taiwan

[21] Appl. No.: 426,232

[22] Filed: Oct. 25, 1989

[51] Int. Cl.$^5$ ............................................. F23J 1/00
[52] U.S. Cl. .................................... 126/25 R; 99/446; 99/482; 126/245; 126/243
[58] Field of Search .............. 99/450, 481, 482, 467, 99/340, 444–446; 126/9 R, 9 B, 25 R, 26, 80, 84, 242, 243, 244, 245

[56] References Cited

U.S. PATENT DOCUMENTS

| | | | |
|---|---|---|---|
| 2,515,521 | 7/1950 | Loffredo | 126/9 B |
| 2,756,738 | 7/1956 | Kratz | 126/25 R |
| 2,960,979 | 11/1960 | Stone | 126/30 |
| 3,126,881 | 3/1964 | Blotsky, Jr. | 126/245 |
| 4,554,864 | 11/1985 | Smith et al. | 99/482 |
| 4,576,140 | 3/1986 | Schlosser | 126/25 R |
| 4,624,239 | 11/1986 | Yellin | 126/245 |
| 4,628,901 | 12/1986 | Poulos | 126/243 |
| 4,741,322 | 5/1988 | Lin | 126/242 |
| 4,763,640 | 8/1988 | Schnack et al. | 126/243 |

FOREIGN PATENT DOCUMENTS 2349020  9/1973  Fed. Rep. of Germany ........ 99/482

*Primary Examiner*—Timothy F. Simone
*Attorney, Agent, or Firm*—Wenderoth, Lind & Ponack

[57] ABSTRACT

Disclosed is an ash-collecting pan and ventilation adjusting device for a barbecue set, of which the bottom of the body portion is formed into a flat bottom with a plurality of through holes provided for ash dropping and ventilation functions. On the outer circumference of the flat bottom, three L-shaped flange plates are provided for mounting the ash-collecting pan under the barbecue set. The ash-collecting pan comprises two rested pans, including an inner pan and an outer pan at a suitable height. The walls of each of the two pans are furnished with several corresponding ventilation apertures. The bottom of the inner pan has a handle attached thereto and extending under the outer pan. The inner pan can be turned by means of the handle so as to vary the size of the corresponding apertures between the two pans, whereby the air supply to the barbecue set may be adjusted. Further, the handle can facilitate insertion and removal of the ash-collecting pan from the barbecue set.

1 Claim, 3 Drawing Sheets

ASH-COLLECTING PAN AND VENTILATION ADJUSTING DEVICE FOR A BARBECUE SET

BACKGROUND OF THE INVENTION

Field of the Invention

This invention relates to an ash-collecting pan and ventilation adjusting device for a barbecue set, and particularly to such a device for an apple-shaped barbecue set with a top lid. The main feature of the device is that the bottom edge portion of the body portion is furnished with three L-shaped flange plates for attaching an ash-collecting pan in a detachable manner. The ash-collecting pan includes a nest of two pans (an inner pan and an outer pan). The wall of each of the pans is furnished with a plurality of ventilation apertures to be aligned with one another. The bottom of the inner pan is mounted with a handle extended out of the bottom of the outer pan. With the handle, the ash-collecting pan not only can collect and dump the ashes of the body portion, but also can adjust the alignment size of the apertures so as to regulate the air supply to the body portion. Further, the handle also can prevent the user from being injured by the hot pan during a cooking operation.

Description of the Prior Art

Currently, there are many kinds of barbecue sets for indoor either or outdoor use; nevertheless, each of them must have a bottom portion with a plurality of ventilation apertures, and an ash-collecting pan. FIGS. 6 and 7 illustrate a conventional apple-shaped barbecue set. Since it has a top lid, the bottom of the body portion is provided with three or more sets of ventilation holes A for supplying adequate air into the body portion and for exhausting ashes out of the body portion. Each of the ventilation holes can be opened or closed by turning a regulating disk B having a plurality of holes. However, such regulating disk has the following drawbacks:

(1) The ashes are to be dropped directly to an ash disk C. Whenever the roasting is conducted outdoors, the ashes are subject to being blown around by the wind. This results in sanitation and cleaning problems.

(2) Since each of the ventilation holes A has a regulating disk B, each of them has to be ajusted in order to align each hole B1 and its corresponding ventilation hole at a given opening size. Such operation becomes cumbersome and repetitive. Further, the user's hand might become injured by the heated regulating disk upon touching the disk.

(3) Since the three sets of ventilation holes are furnished at the bottom of the barbecue set, the ventilation efficiency is deemed poor as a result of the holes not facing the blowing direction of a natural wind. Therefore, the aforesaid drawbacks should be eliminated.

SUMMARY OF THE INVENTION

The prime object of the present invention is to provide an ash-collecting pan and ventilation adjusting device for an apple-shaped barbecue set, which includes three L-shaped flange plates on the bottom of the body portion for holding an ash-collecting pan to collect ashes exhausted out of the body portion, and to prevent the ashes from being blown into the air by wind during cooking. In other words, the cooking area can be maintained in a clean and sanitary condition. Moreover, since the ash-collecting pan is mounted under the barbecue set with three L-shaped flange plates in a detachable manner, the device is of a practical and simple structure.

Another object of the present invention is to provide an ash-collecting pan and ventilation adjusting device, which includes two nested pans, i.e., an inner pan and an outer pan, the walls of which are furnished with several corresponding ventilation apertures. The bottom of the inner pan is mounted with a handle extended under the outer pan. By means of the handle, the user can easily adjust the air supply into the barbecue set without directly touching the hot ash-collecting pan with his hand so as to avoid injury.

Still another object of the present invention is to provide an ash-collecting pan and ventilation adjusting device, of which the ash-collecting pan has a given height to facilitate the provision of several ventilation apertures on the wall thereof so as to directly receive the wind blowing from any direction to supply adequate air into the barbecue set.

DESCRIPTION OF THE PREFERRED EMBODIMENT

Figure 1:
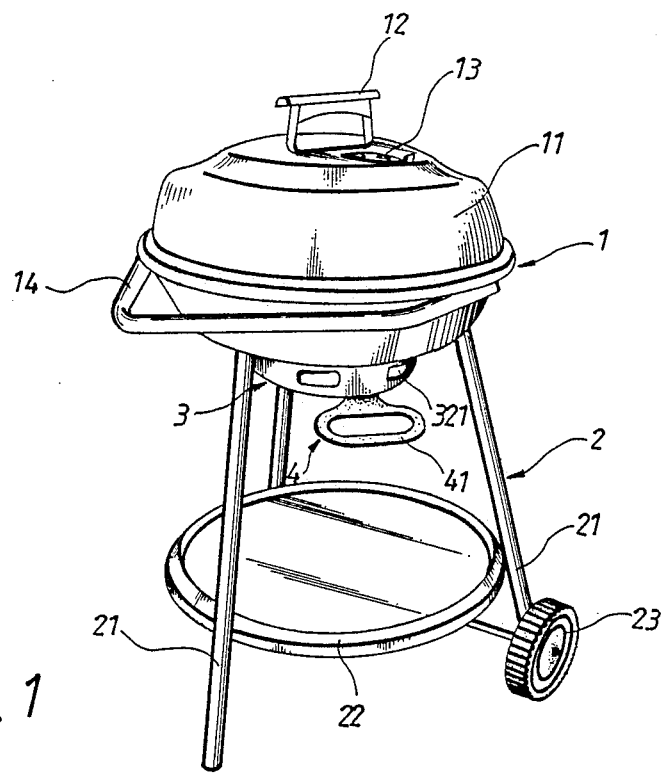
FIG. 1 is a perspective view of an embodiment according to the present invention.

FIG. 1 illustrates the ash-collecting pan and ventilation adjusting device of a barbecue set according to the present invention which mainly comprises a barbecue set body portion 1, legs 2, ash-collecting pan 3 and handle 4.

The body portion 1 includes a top lid 11 with a lid handle 12 and a ventilation hole 13. The lid handle 12 is used to remove the top lid 11, and the ventilation hole 13 is used for bleeding vapor. The body portion 1 is provided with a pushing handle 14 mounted symmetrically on two sides thereof. The bottom leg joints 15 are spaced equally from one another so as to mount three legs 2, respectively.

Figure 2:
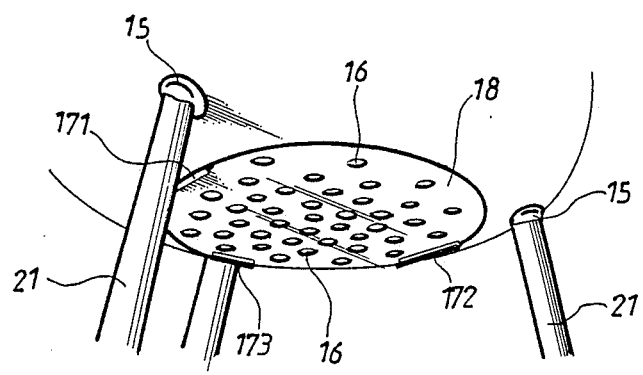
FIG. 2 is a bottom view of the barbecue set according to the present invention.

As shown in FIG. 2, the bottom of the body portion 1 is formed into a flat bottom 18 having a plurality of holes 16, which are used to exhaust ashes and to provide ventilation. On the outer circumference of the flat bottom 18, there are three L-shaped flange plates 171, 172 and 173, spaced 90° from one another about the flat bottom 18. These flange plates include flange portions extending inwardly to form an inward groove so as to let the ash-collecting pan 3 be inserted into the flange plates upon being assembled. The plates 171 and 172 are arranged at an angle of 180° from one another.

Figure 3:
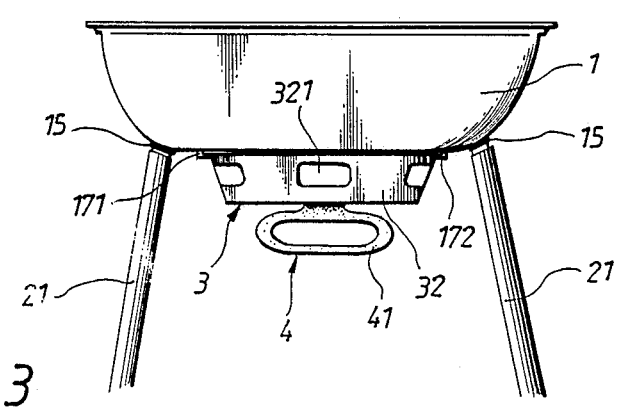
FIG. 3 illustrates the ash and ventilation adjusting device being assembled together with the barbecue set.
Figure 4:
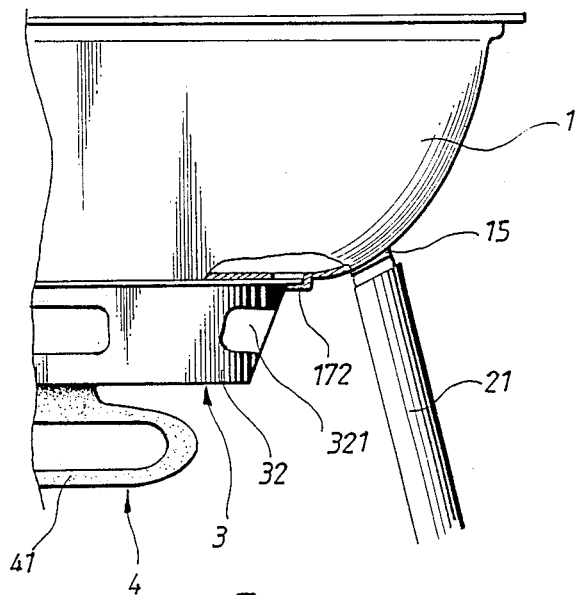
FIG. 4 is a partial sectional view of the present invention assembled together with the barbecue set.

The legs 2 include three straight pipes 21 fitted into three leg joints 15, respectively on the bottom of the body portion 1 as shown in FIGS. 2 and 3. A round pan, used for placing something thereon is mounted to and between the three legs. The lower ends of two of the three straight pipes 21 have two wheels 23 respectively mounted thereon.

Figure 5:
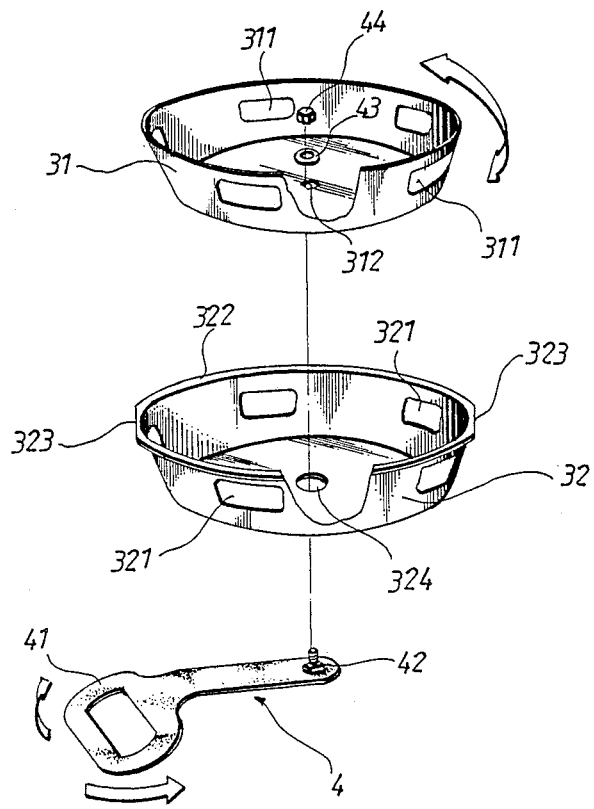
FIG. 5 is a disassembled view of the ash-collecting pan according to the present invention.
Figure 6:
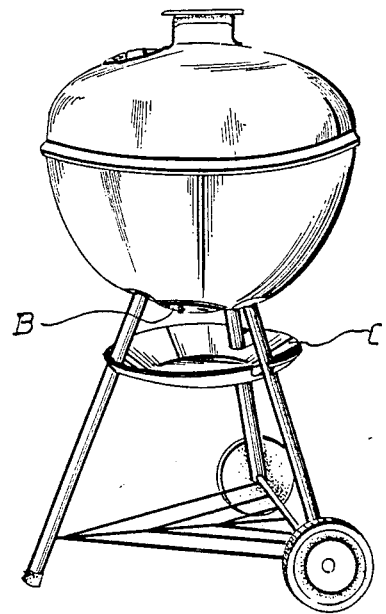
FIG. 6 is an external view of a conventional apple-shaped barbecue set with a top lid.
Figure 7:
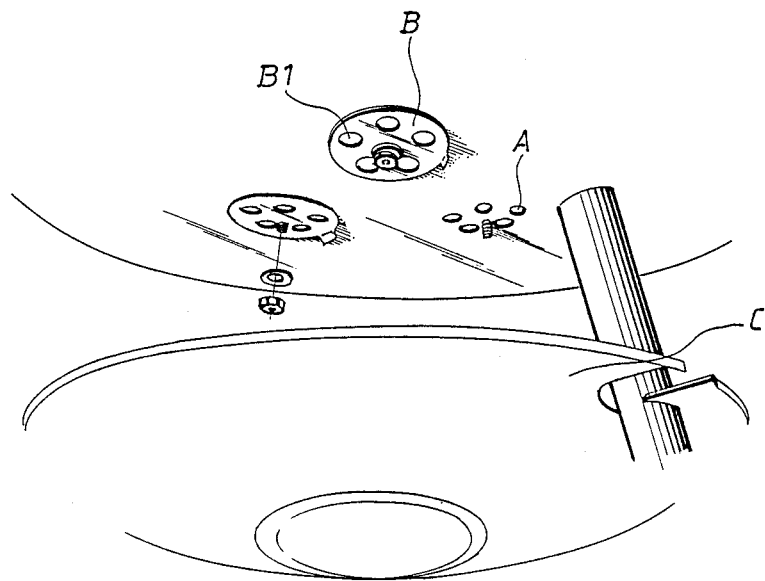
FIG. 7 illustrates the ventilation structure of a conventional apple-shaped barbecue set with a top lid.

The ash-collecting pan 3 as shown in FIG. 5 includes two nested pans, i.e., an inner pan 31 and an outer pan 32. Each of the pans has a suitable depth, and several ventilation apertures 311 or 321. The outer pan 32 has an upper flat edge 322 with two opposite parallel and straight edge portions 323, which can be inserted and fit into the two corresponding inward grooves formed by the L-shaped flange plates 171 and 172 so as to mount the nested pans under the body portion 1. The bottom center of the inner pan 31 has a rectangular hole 312, while the bottom center of the outer pan 32 has a round hole 324, which is larger than the rectangular hole 312.

The handle 4 is an elongate plate, of which one end is formed into a ring-shaped handle 41 while the other end is furnished with a screw 42 which has a rectangular head and which can, 32, fit into the rectangular hole 312 of the inner pan 31. A washer 43 and a nut 44 are mounted on the screw 42 so as to fix the inner and outer pans 31 and 32 together as an ash-collecting pan 3.

According to the aforesaid structure of the present invention the three L-shaped flange plates 171, 172 and 173 are particularly designed to facilitate insertion and removal of the ash-collecting pan 3 to be inserted or detached from the body portion 1 of the present invention in a quick and simple manner. After the ash-collecting pan 3 is inserted under the body portion 1 and ashes in the barbecue set can fall through holes 16 and into the ash-collecting pan 3 so as to prevent the ashes from flying into the air and from causing any hazard.

After the two opposite parallel and straight flat edges 323 of the outer pan 32 are engaged with the two corresponding inward grooves formed by the L-shaped flange plates 171 and 172, the inner pan 31 may be turned by holding the handle 4. In this manner, the ventilation apertures 311 of the inner pan 31 and the corresponding ventilation apertures 321 on the outer pan 32 can be aligned in a manner to vary the size of the aligned corresponding apertures. Therefore, the air volume flowing into the body portion 1 can be varied during cooking. Since the ash-collecting pan 3 has a given height, the wind from any direction can flow into the body portion 1 to strengthen the burning. The handle 4 not only can be used for turning the ash-collecting pan 3 for varying the air supply, and inserting or detaching the ash pan from the body portion 1, but also can prevent the user from directly touching the heated body portion 1 and becoming injured whenever turning the ash pan to regulate the air supply.

What is cliamed is:

1. An ash-collecting pan and ventilation adjusting device in combination with a barbecue set, comprising:
   a body portion of the barbecue set having a flat bottom with a plurality of holes and three L-shaped flanges spaced 90° from one another about the outer circumference of said flat bottom, each of said L-shaped flanges forming an inwardly facing groove;
   an ash-collecting pan including an inner pan, and an outer pan nested with said inner pan, and having a given height, the wall of each of said pans having several corresponding ventilation apertures, said inner pan being slightly smaller than said outer pan such that it can nest inside said outer pan, the upper edge of said outer pan including two opposing parallel straight edge portions removably received in two opposing grooves of said inwardly facing grooves, respectively, the bottom center of said inner pan having a rectangular hole therein with a predetermined diagonal dimension, and the bottom center of said outer pan having a round hole therein which is larger in diameter than the diagonal dimension of said rectangular hole; and
   a handle made of an elongate plate, of which one end is formed into a ring-shaped handle and disposed at an angle relative to the other end thereof, said other end having a screw mounted thereto, the screw having a rectangular portion adapted to pass through the round hole of said outer pan and mate with the rectangular hole of said inner pan, a nut being received on said screw so as to cause said handle, said inner pan and said outer pan to be assembled together as an ash-collecting pan adapted to be received in said grooves formed by said three L-shaped flanges; such that when said ash-collecting pan is inserted into said three L-shaped flange plates on the bottom of said body portion of said barbecue set, said inner pan can be turned by operating said handle so as to adjust the size of said ventilation apertures for regulating the air supply to said barbecue set during cooking.

* * * * *